US010447969B2

(12) United States Patent
Kuwata (10) Patent No.: US 10,447,969 B2
(45) Date of Patent: Oct. 15, 2019

(54) IMAGE PROCESSING DEVICE, IMAGE PROCESSING METHOD, AND PICTURE TRANSMISSION AND RECEPTION SYSTEM (71) Applicant: Koji Kuwata, Kanagawa (JP)

(72) Inventor: Koji Kuwata, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 15/911,199

(22) Filed: Mar. 5, 2018

(65) Prior Publication Data
US 2018/0270450 A1    Sep. 20, 2018

(30) Foreign Application Priority Data

Mar. 14, 2017 (JP) .................................. 2017-049214

(51) Int. Cl.
H04N 7/15         (2006.01)
H04N 5/232        (2006.01)
(Continued)

(52) U.S. Cl.
CPC ............. *H04N 7/15* (2013.01); *H04N 5/2353* (2013.01); *H04N 5/23216* (2013.01);
(Continued)

(58) Field of Classification Search
USPC .......................................... 348/14.01–14.08
See application file for complete search history.

(56) References Cited

U.S. PATENT DOCUMENTS

2001/0043277 A1*  11/2001  Tanaka ............... H04N 5/23293
                                                                348/333.01
2003/0156577 A1*   8/2003  Dunlap .................. H04L 29/06
                                                                     370/352
(Continued)

FOREIGN PATENT DOCUMENTS

EP    3 043 547 A1    7/2016
JP    9-168139        6/1997
(Continued)

OTHER PUBLICATIONS

Extended European Search Report dated Jul. 19, 2018 in Patent Application No. 18160725.0, citing documents AO & AP therein, 10 pages.

*Primary Examiner* — Maria El-Zoobi
(74) *Attorney, Agent, or Firm* — Oblon, McClelland, Maier & Neustadt, L.L.P.

(57) ABSTRACT

An image processing device, an image processing method, and a picture transmission and reception system. The image processing device and the image processing method include detecting a change in a capturing environment, and updating, when the change in the capturing environment is detected, based on the detected change, parameter information in which a parameter to be used for picture processing is linked to each one of a plurality of display areas included in picture data generated. The picture transmission and reception system includes a first end device and a second end device each of which includes an imaging device configured to capture an image to generate picture data. The first end device and the second end device exchange a display area cropped from picture data obtained by capturing an image by the imaging device included in each one of the first end device and the second end device.

8 Claims, 4 Drawing Sheets (51) Int. Cl.
    *H04N 5/262*       (2006.01)
    *H04N 5/235*       (2006.01)
    *H04N 7/14*         (2006.01)

(52) U.S. Cl.
    CPC ..... *H04N 5/23293* (2013.01); *H04N 5/23296* (2013.01); *H04N 5/2628* (2013.01); *H04N 7/142* (2013.01); *H04N 7/147* (2013.01)

(56) References Cited

U.S. PATENT DOCUMENTS

| | | | |
|---|---|---|---|
| 2005/0117025 A1* | 6/2005 | Ambiru | G08B 13/19656 348/211.99 |
| 2009/0268023 A1* | 10/2009 | Hsieh | H04N 5/2354 348/143 |
| 2012/0140985 A1* | 6/2012 | Hattori | H04N 5/147 382/103 |
| 2014/0204260 A1* | 7/2014 | Ha | G09G 3/00 348/333.01 |
| 2014/0247376 A1 | 9/2014 | Kuwata | |
| 2015/0036037 A1* | 2/2015 | Reed | G03B 17/02 348/340 |
| 2015/0049220 A1 | 2/2015 | Kuwata | |
| 2015/0193914 A1 | 7/2015 | Kuwata | |
| 2016/0198077 A1 | 7/2016 | Kuwata | |

FOREIGN PATENT DOCUMENTS

| | | |
|---|---|---|
| JP | 10-164420 | 6/1998 |
| JP | 2001-211446 | 8/2001 |
| JP | 2004-129002 | 4/2004 |
| JP | 2009-111892 A | 5/2009 |
| JP | 2011-101070 | 5/2011 |
| JP | 2011-237713 | 11/2011 |

\* cited by examiner

IMAGE PROCESSING DEVICE, IMAGE PROCESSING METHOD, AND PICTURE TRANSMISSION AND RECEPTION SYSTEM

CROSS-REFERENCE TO RELATED APPLICATION

This patent application is based on and claims priority pursuant to 35 U.S.C. § 119(a) to Japanese Patent Application No. 2017-049214, filed on Mar. 14, 2017, in the Japan Patent Office, the entire disclosure of which is hereby incorporated by reference herein.

BACKGROUND

Technical Field

Embodiments of the present disclosure relate to an image processing device, an image processing method, a carrier means storing an image processing program, and a picture transmission and reception system.

Background Art

In a videoconference system where a higher priority is given to real-time picture, the posture and the position of a camera changes due to, for example, pan tilt manipulations. Due to this configuration, the time that corresponds to several frames was required to update the parameters to be used for picture control with feedback processing such as autoexposure (AE).

In such a videoconference system as above, parameters to be used for picture control on every posture and position of a camera may be preset to a dedicated storage device in advance. By so doing, parameters to be used for picture control that are considered to be optimal for the posture and position of a camera of the present time can be obtained from the storage device with no feedback processing, and optimized picture can be obtained without delay as the necessary to calculate parameters can be avoided.

SUMMARY

Embodiments of the present disclosure described herein provide an image processing device, an image processing method, and a picture transmission and reception system. The image processing device and the image processing method include detecting a change in a capturing environment, and updating, when the change in the capturing environment is detected by the detecting, based on the detected change, parameter information in which a parameter to be used for picture processing is linked to each one of a plurality of display areas included in picture data generated by an imaging device. The picture transmission and reception system includes a first end device and a second end device each of which includes an imaging device configured to capture an image to generate picture data. The first end device and the second end device exchanges a display area cropped from picture data obtained by capturing an image by the imaging device included in each one of the first end device and the second end device.

BRIEF DESCRIPTION OF THE DRAWINGS

A more complete appreciation of exemplary embodiments and the many attendant advantages thereof will be readily obtained as the same becomes better understood by reference to the following detailed description when considered in connection with the accompanying drawings.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more central processing units (CPUs), digital signal processors (DSPs), application-specific-integrated-circuits (ASICs), field programmable gate arrays (FPGAs), computers or the like. These terms in general may be collectively referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Hereinafter, an image processing device, an image processing method, a carrier means, and a picture transmission and reception system according to an embodiment of the present disclosure are described in detail with reference to the accompanying drawings.

Before describing a configuration of the present embodiment in detail, an outline of the present embodiment is described. By way of example, a digital pan-tilt-zoom (DPTZ) function is described. In the digital pan-tilt-zoom function, all the pixels (i.e., all the blocks) of the picture data that is generated as an image sensor (imaging device) captures an image are not to be output for display or the like. In the digital pan-tilt-zoom function, a partial area (display area) is cropped from the picture data, and the cropped partial area is used as an effective image area (an area that is actually displayed, for example, on a monitor). The area to be output may be of any size and at any position. As long as photometry is performed appropriately on the cropped area, optimized picture can be obtained. In other words, the pixels that are not to be displayed may be ignored. Note that such a cropped area in the present embodiment may be referred to as a cropping area in the following description.

It is desired that the coordinates or size of the above cropping area be determined in advance. In other words, a cropping area is to be cropped with granularity/particle size that allows, at least in appearance, seamless pan tilt manipulations (its detailed description will be given later). Parameters to be used for picture control (set values for autofocus (AF) or autoexposure (AE)) are preset for each of the prescribed patterns of cropping areas. How the parameters are updated is schematically described below.

(1) Immediately after the power is turned on, the raw data of the entire area is obtained from the image sensor. Typically, picture processing is performed on a default cropping area using the preset parameters, and the data of the cropping area is output.

(2) Together with the above processes, optimal parameters to be used for picture control are calculated for other cropping areas in the background. Note also that some kinds of processes, such as autofocus (AF), which are unsuitable for processes in the background, are excluded in the present embodiment. Then, the calculated parameters are linked to the other respective cropping areas, and are stored storage device.

(3) Once the pan tilt manipulations start, the preset parameters for camera control are replaced with the parameters calculated in (2) as above, according to the display area of the present time.

(4) In regard to the autofocus (AF), a parameter is set while actually viewing an image, and is stored in the storage device at the same time. When the same cropping area is to be used as the display area next time, the stored parameters can be used just as they are. The parameters of autoexposure (AE) or the like (including the parameters of the storage device) are also updated while actually capturing an image. It is not necessary to use the preset parameters in a continuous manner. Those preset parameters are used to display optimized picture at a time earlier than when optimal parameters are calculated from scratch. When the displaying direction changes in a seamless manner, for example, exposure control cannot be implemented by feedback. For this reason, when the displaying direction changes in a seamless manner, parameters that are precise to some degree need to be set in advance from the beginning.

(5) As long as the capturing environment of the image sensor is unchanged, a group of parameters that are preset on an area-by-are basis can be used in a continuous manner even when pan tilt manipulations are being performed.

(6) However, when the capturing environment changes, the picture that is optimized for the scene of the present time cannot be obtained with the preset parameters as they are.

(7) In order to handle such a situation, in the present embodiment, when a change in the capturing environment is detected, the preset parameter is updated in the background for each of the cropping areas including the areas that are not to be output (i.e., the cropping areas that are not displayed). In other words, the preset parameter is optimized for a change in the capturing environment, and is updated. Due to the configuration as described above, even if the capturing environment changes, (the parameters of) the pan tilt picture can be optimized.

Embodiments of the present disclosure are described below in detail with reference to the accompanying drawings.

Figure 1:
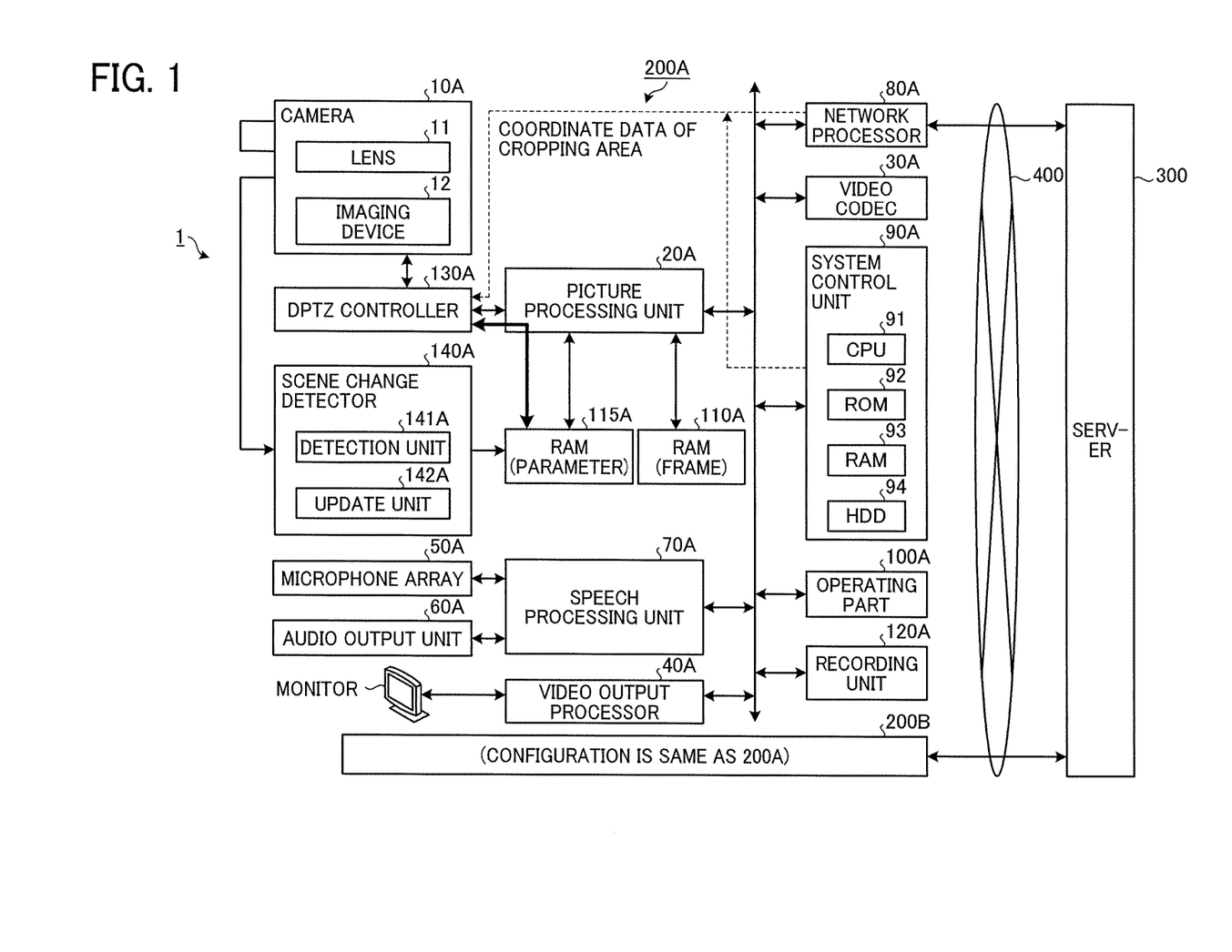
FIG. 1 is a diagram illustrating a configuration of a videoconference system according to an embodiment of the present disclosure.

FIG. 1 is a diagram illustrating a configuration of a videoconference system 1, which serves as a video transmission and reception system, according to the present embodiment.

As illustrated in FIG. 1, the videoconference system 1 includes a first end device 200A that is arranged at a first site (i.e., on the transmission side in the present embodiment), a second end device 200B that is arranged at a second site (i.e., on the reception side in the present embodiment), and a server 300 that manages the conference, and these elements can be interconnected, for example, through a network 400 such as the Internet or an intranet. In the following description, the first end device 200A and the second end device 200B may collectively be referred to as an end device 200 or end devices 200 when it is not necessary to distinguish between the first end device 200A and the second end device 200B. In the present embodiment, the end device 200 is an example of an image processing device.

In FIG. 1, an example case is described in which the first site is on the transmission side, and the second site is on the reception side. However, in actuality, each of the end devices 200 that are arranged at the respective sites has the same configuration, and both of the end devices 200 can perform data transmission and data reception. In the following description, "A" is added to the tail end of each element of the first end device 200A so as to be distinguished from the elements of the second end device 200B. In other words, a configuration of the end device 200 is described with reference to the first end device 200A that serves as an example of the end device 200.

As illustrated in FIG. 1, the first end device 200A includes a camera 10A, a picture processing unit 20A, a video coder/decoder (CODEC) 30A, a video output processor 40A, a microphone array SOA, an audio output unit 60A, a speech processing unit 70A, a network processor 80A, a system control unit 90A, an operating part 100A, a recording unit 120A, a random access memory (RAM) 110A and a RAM 115A that come with the picture processing unit 20A, a digital pan-tilt-zoom (DPTZ) controller 130A, and a scene change detector 140A that comes with the DPTZ controller 130A.

The camera 10A captures and inputs the images of the scenes of a conference. In the present embodiment as illustrated in FIG. 1, the camera 10A is provided with a lens 11 and an imaging device 12 (image sensor) that converts the picture that is concentrated through the lens 11 into electrical signals, and picture data is generated as the imaging device 12 capture images. In the present embodiment, the imaging device 12 generates picture data that is temporally continuous by capturing images in a temporally continuous manner. For example, the picture data may be a spherical image or an omnidirectional image. In the present embodiment, the picture data that is generated by the camera 10A is input to the picture processing unit 20A as raw data through the DPTZ controller 130A.

The picture processing unit 20A generates YUV data by performing processes that are known in the art of camera picture processing such as Bayer conversion or 3A control on the raw data that is transferred from the camera 10A. Note that the initial parameters for the 3A control or the like are stored in advance in the RAM 115 that come with the picture processing unit 20A. The picture processing unit 20A updates the parameters where appropriate as necessary while performing feedback processing.

After the YUV data is generated, as the subsequent step, the picture processing unit 20A performs geometrical correction (for example, affine transformation) on the YUV data generated as above, and then transfers the corrected YUV data to the video CODEC 30A. Note also that the parameters for the affine transformation or the like are also stored in the RAM 115A that come with the picture processing unit 20A.

A plurality of sets of parameters are independently provided, and those sets of parameters include, for example, a parameter used for picture processing by the camera 10 (including a parameter to be used for exposure control) and a parameter used for affine transformation. Which of the sets (groups of parameters) is to be selected is determined by collaborative operation with the DPTZ controller 130A, and which of the sets is to be used is determined for each of the frames as necessary. Its detailed description will be given later.

In order to perform encoding and decoding on streaming video data, the video coder/decoder (CODEC) 30A is implemented by codecs such as H.264 and H.265 or by software. In regard to the picture to be sent out, the video coder/decoder (CODEC) 30A encodes the picture input from the picture processing unit 20A, and transfers the encoded picture obtained by performing encoding as above to the network processor 80A. In regard to the received picture, the video coder/decoder (CODEC) 30A takes in the encoded picture that is transferred from the counterpart station (i.e., the second end device 200B) through the network processor 80A, and decodes the encoded picture and transfers the decoded picture to the video output processor 40A.

The video output processor 40A controls a monitor (display device) to display the received picture that is decoded by the video CODEC 30A or the local picture. When the picture of a plurality of sites are to be displayed, the video output processor 40A performs rendering processes on the picture to be displayed onto the monitor in accordance with the layout configuration data sent from the operating part 100A.

The microphone array 50A picks up the voice of the speakers at the conference by a microphone, and transfers the voice data to the speech processing unit 70A upon converting the voice data into digital data (analog-to-digital (A/D) conversion). When the end device 200 is provided with a speaker tracking function, a plurality of microphones may be arrayed and the voice may be picked up by those arrayed microphones in order to specify the direction of a speaker.

The audio output unit 60A converts the voice data transmitted from a different site into analog signals (digital-to-analog (D/A) conversion), and outputs the converted analog signals to a loudspeaker.

The speech processing unit 70A takes in the voice data input through the network processor 80A from a different site, and performs voice data processing known in the art such as codec processes and noise canceling (NC) processes. Then, the speech processing unit 70A transfers the processed data to the audio output unit 60A. At the same time, the speech processing unit 70A performs echo cancellation (EC) processes on the voice data input to the microphone array 50A, while controlling the voice data that is transferred to the audio output unit 60A.

The speech processing unit 70A performs voice data processing known in the art such as codec processes and echo cancellation (EC) processes on the voice data that is transferred from the microphone array 50A. Then, the speech processing unit 70A transfers the processed data to the network processor 80A, while synchronizing with the picture data that is being transferred.

In regard to the picture to be sent out, the network processor 80A transfers the encoded picture that is transferred from the video CODEC 30A, to the destination device, i.e., the second end device 200B, through the network 400. In regard to the picture to be received, the network processor 80A takes in the encoded picture that is transferred from the counterpart station (i.e., the second end device 200B) through the network 400, and transfers the encoded picture to the video CODEC 30A.

In the present embodiment, the network processor 80A also has a function of monitoring the bandwidth of the network 400 in order to determine a parameter (e.g., a quasi-peak value) for encoding. Moreover, in order to optimize a parameter for encoding or the settings of a transmission mode, the network processor 80A also has a function of inputting the data of the functionality or capability of a counterpart station.

The system control unit 90A is responsible for the system control of the entirety of the first end device 200A, and performs mode setting or status management for multiple modules or blocks in accordance with the instructions given from an operator. Typically, the system control unit 90A includes, for example, a user interface and a processor as well as a program for the processor. In some cases, the system control unit 90A includes a system memory (RAM) that can be shared by other multiple modules, and also has, for example, a function to control the right to use the system memory or the access right to a system (common) bus. In the present embodiment as illustrated in FIG. 1, the system control unit 90A is provided with at least a central processing unit (CPU) 91, a read only memory (ROM) 92, a random access memory (RAM) 93, and hard disk drive (HDD) 94. In the present embodiment, the CPU 91 controls the operation of the first end device 200A in a centralized manner by performing in the RAM 93 various kinds of programs stored in the ROM 92 or the HDD 94. In regard to the control function in the present embodiment, for example, the DPTZ controller 130A is notified of the coordinate data of a cropping area (sampling area) that varies according to the pan tilt manipulations. The pan tilt command is not limited to a command that is given from the operating part 100A based on the local operation processes. A command related to the pan tilt manipulations may be received from the counterpart station (destination device) through the network.

In regard to the operating part 100A, an operator performs pan tilt manipulations on the operating part 100A, while viewing the picture displayed on the monitor. The instructions for the direction or the like of the pan tilt are once sent to the system control unit 90A, and then the operator issues optimal settings or commands at that time to each module, while monitoring the status of the other modules that are managed by the system control unit 90A. Moreover, operation or manipulations such as various types of settings or calling a conference participant are made through the operating part 100A.

The RAM 110A is a buffer that operates in synchronization with the picture processing unit 20A. The RAM 115A is a buffer that stores a set of parameters that change in synchronization with the picture processing unit 20A and the DPTZ controller 130A. Note that such a set of parameters include a parameter used for picture processing and a parameter used for affine transformation. The RAM 115A stores a set of parameters that are linked to each one of the areas (cropping areas) that are cropped by the DPTZ controller 130A. In the present embodiment, the RAM 115A is an example of a storage unit, and stores parameter information in which at least a parameter to be used for picture processing is linked to each one of a plurality of display areas (cropping areas) included in the picture data generated by the imaging device (i.e., the camera 10A). In the parameter information, a set of parameters is linked to each of the multiple cropping areas. In the present embodiment, a set of parameters includes a parameter used for picture processing and a parameter used for affine transformation.

In the present embodiment, a set of parameters that is linked to the cropping area of the picture, which is sent from the DPTZ controller 130A, is selected from a plurality of sets of parameters stored in the RAM 115A. Note also that the RAM 110A and the RAM 115A may be formed as a single integrated unit. The granularity/particle size of a cropping area determines the desired capacity of the RAM, and whether the RAM 110A and the RAM 115A are to be formed as a single integrated unit or to be configured independently from each other is determined based on the system-performance conditions such as the bandwidth that is required for memory transfer process.

The recording unit 120A takes in the voice data and the picture data during the conference from the speech processing unit 70A and the video output processor 40A, and locally records the video of the scene of the conference. The scene of the conference can be reproduced on the device as recording unit 120A outputs the recorded data to the speech processing unit 70A and the video output processor 40A.

The scene change detector 140A includes a detection unit 141A and an update unit 142A. The detection unit 141A detects a change in the capturing environment. In the present embodiment, the detection unit 141A monitors the changes in the environment at the position where the camera 10A is disposed, in synchronization with the camera 10A. By way of example, the detection unit 141A can also detect a change in the capturing environment from the degree of change in the picture data. For example, the detection unit 141A generates a histogram (a distribution of values of brightness) for each of the frames of the picture data (i.e., the entire image data) that is continuously input from the camera 10A, and a scene change may be detected according to the degree of change in histogram. In a different point of view, the detection unit 141A is detecting a change in the capturing environment whose degree of change is equal to or greater than a predetermined value.

When a change in the capturing environment is detected by the detection unit 141A, the update unit 142A updates the parameter information (i.e., the data in which a set of parameters is linked to each of the multiple cropping areas) based on the detected change. In the present embodiment, the update unit 142A calculates an optimal value for a parameter used for picture processing, for each one of the plurality of cropping areas (display areas), from the picture data when a change in the capturing environment is detected by the detection unit 141A, and updates the parameter used for picture processing with the calculated optimal value. A parameter to be used for picture processing includes a parameter to be used for exposure control, and includes at least an exposure time. As described above, the parameter information that is stored in the RAM 115A is updated to an appropriate value in view of the changes in the environment (a set of parameters that is linked to each cropping area is updated).

As in the present embodiment, if it is configured such that the raw data that is equivalent to the raw data sent to the picture processing unit 20A can be transferred to the scene change detector 140A, feedback processing based on the real picture data, such as Bayer conversion or 3A control, which is known in the art of camera picture processing, can be performed on the raw data that is transferred from the camera 10A. However, it is to be noted that the purpose of such feedback processing is not to generate to-be-displayed picture in the present embodiment. Instead, the purpose of such feedback processing is to update a set of parameters that is linked to each cropping area and is stored in the RAM 115A as necessary according to the current environment. Due to the configuration as described above, when the pan tilt manipulations actually start, parameters (on which feedback processing has been performed) that are updated for each of the cropping areas are already set in the RAM 115A. Accordingly, the picture processing unit 20A can obtain an almost optimal parameter from the beginning. In other words, no delay occurs due to feedback processing that is performed to achieve optimal picture, or at least, the delay can significantly be reduced.

In the present embodiment, the scene change detector 140A is configured by dedicated hardware circuitry (for example, a semiconductor integrated circuit). However, no limitation is intended thereby, and the scene change detector 140A may be implemented, for example, by software. For example, the functions of the scene change detector 140A (i.e., the functions of each of the detection unit 141A and the update unit 142A) may be implemented as the CPU 91 executes a program.

Next, the processes according to the present embodiment are described with reference to FIG. 2 and FIG. 3, in which a parameter used for picture processing during the pan tilt manipulations (a parameter (including, for example, an exposure time) to be used for exposure control) is optimized without delay.

Figure 2:
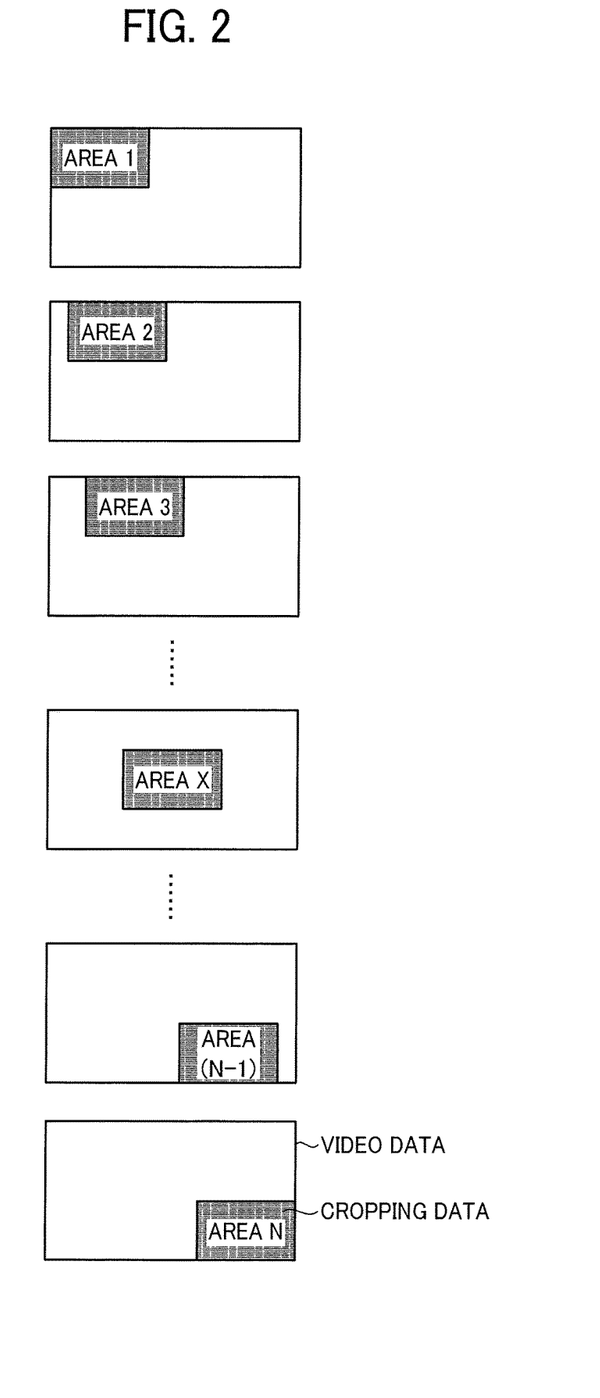
FIG. 2 is a diagram illustrating the processes in which a parameter used for picture processing during the pan tilt manipulations is optimized without delay, according to an embodiment of the present disclosure.

The contour lines illustrated in FIG. 2 indicate the areas (the areas of the entire picture data) when all the pixels of the picture data generated by the imaging device 12 are made operative, and the gray areas in FIG. 2 indicate the areas that are cropped as actual display areas (cropping areas). In the digital pan-tilt-zoom (DPTZ) systems, a super wide-angle lens and a high-resolution sensor are provided, and a display area is selected (cropped) as desired. Due to this configuration, pan tilt manipulations are seemingly achieved. No particular restriction is to be imposed on the granularity/particle size of a cropping area (how areas are cut out) or the area size of the cropping area. The granularity/particle size of the cropping area or the area size of the cropping area may be determined in view of the throughput of the picture processing unit 20A or the capacity of the storage unit provided for the system (i.e., the capacity of the RAM 115A).

As a super wide-angle lens is used, the distance to an object or the direction in which the object is placed varies for each cropping area. Accordingly, a parameter to be used for picture processing, which includes a set value (e.g., an exposure time) for the imaging device 12, also varies. As the picture is captured by a super wide-angle lens, a geometrical correction value (a parameter used for affine transformation) also varies for each area. The above parameter that is used for picture processing and the above parameter that is used for affine transformation are associated with each other as a set, and the optimal values for these parameters are individually linked to each of the cropping areas and are stored in the RAM 115A.

Figure 3:
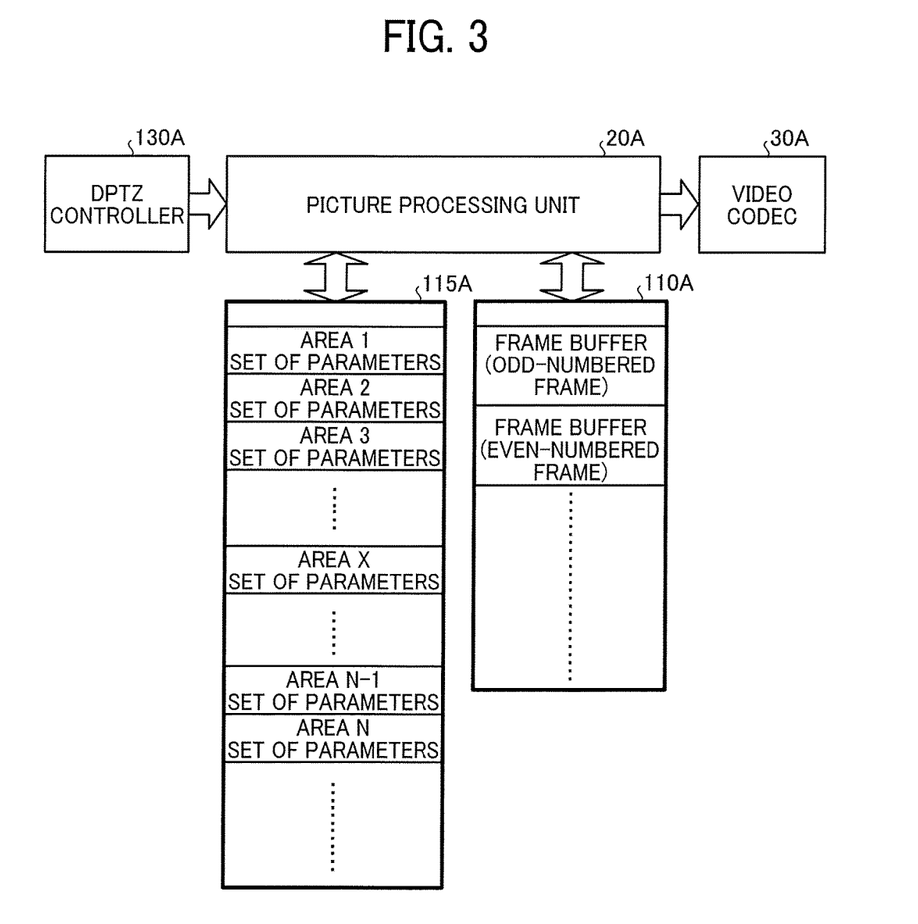
FIG. 3 is a diagram illustrating the processes in which a parameter used for picture processing during the pan tilt manipulations is optimized without delay, according to an embodiment of the present disclosure.

In the present embodiment as illustrated in FIG. 3, the picture data (raw data) that is transferred from the imaging device 12 is cropped in the DPTZ controller 130A, and the cropped picture is input to the picture processing unit 20A. It is desired that the picture processing unit 20A keep track of which of the cropping areas are to be input next in advance, and the data of which of the cropping areas are to be input next is obtained from the network processor 80A or the system control unit 90A.

The picture processing unit 20A obtains the data of the cropping area (for example, the coordinates of the cropping area) to be input next from the network processor 80A or the system control unit 90A, and a set of parameters that is linked to that cropping area (a parameter used for picture processing and a parameter used for affine transformation) is loaded from the RAM 115A. Then, the picture processing unit 20A sets the imaging device 12 in accordance with the loaded set of parameters. At the same time, the data of the next cropping area (for example, the coordinates of the cropping area) is also transferred to the DPTZ controller 130A.

Due to the configuration as described above, the raw data of the entire picture data generated by the imaging device 12 is not transferred to the picture processing unit 20A, but the raw data (i.e., the data of the cropping area) that is cropped by the DPTZ controller 130A is transferred to the picture processing unit 20A. As the picture processing unit 20A (i.e., an image signal processor (ISP) provided for the picture processing unit 20A) performs predetermined picture processing on that data (the data of the cropping area), displayable YUV data can be obtained. However, that picture is not necessarily the picture obtained through the center of the lens. In view of the above circumstances, after the distortion due to the properties and characteristics of the lens is removed by performing affine transformation, the picture data is transferred to the next processing unit, i.e., the video CODEC 30A.

Moreover, the picture processing unit 20A performs feedback processing such as exposure control at the same time. When it is determined that the parameter that was stored in the RAM 115A is not appropriate, such a parameter may be rewritten or updated.

Figure 4:
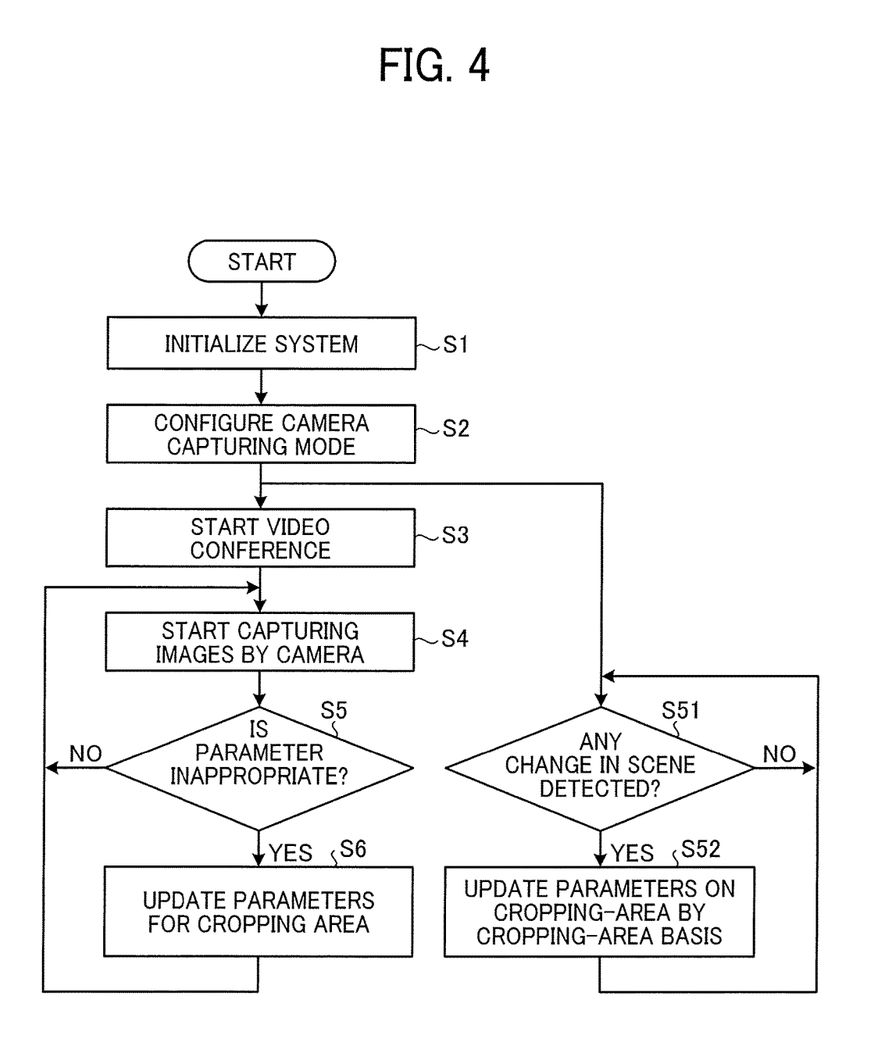
FIG. 4 is a flowchart of operation of a videoconference system according to an embodiment of the present disclosure.

FIG. 4 is a flowchart of operation of the videoconference system 1 according to the present embodiment. As illustrated in FIG. 4, the system control unit 90A firstly initializes each module at start-up of the system (step S1) to enable the camera 10A to capture images. Next, the system control unit 90A sets (initializes) the capturing modes of the camera such as photometric conditions according to the environments of the conference (step S2). At this moment in time, a parameter to be used for picture processing, which is stored in the RAM 115A, is configured at be default value. As a parameter used for affine transformation is a fixed value that is determined by the properties and characteristics of the lens 11, such a parameter is stored in the HDD 94 of the system control unit 90A in advance. In the present embodiment, a parameter that is already stored in the HDD 94 (a parameter used for affine transformation) may just be copied to the RAM 115A. Afterward, the capturing mode of the camera 10A is configured in accordance with the manual setting made by an operator. After the step S1 and the step S2 as above, the system waits for the start of the conference.

After the step S1 and the step S2 as above, in other words, at the timing when the system unit becomes ready, the system control unit 90A sends a request to start communication to a connected counterpart terminal, and start a video conference (step S3). Otherwise, the system control unit 90A start a video conference in response to the request to start video communication sent from the counterpart station. Note also that when video recording is to be performed, the recording unit 120A may be started at this moment in time.

Then, the camera 10A starts capturing an image (normal capturing) (step S4). When the system control unit 90A receives a pan tilt command from the site on the other side through the operating part 100A or the network processor 80A, the system control unit 90A changes the cropping area according to the received pan tilt command. This is the pan tilt manipulations in appearance. Note also that the cropping area may be changed seamlessly like pan tilt operation, or the cropping area may greatly be varied by speaker tracking operation that works together with the speech processing unit 70A, in order to obtain the picture in a direction completely different from the direction so far (a non-nearby change with no continuity).

The imaging device 12 is configured based on the parameter stored in the RAM 115A. Moreover, feedback processing such as exposure control is performed also on the raw data that is generated by the capturing of the imaging device 12 configured as above. The picture processing unit 20A calculates a parameter to be used for exposure control (i.e., typically an exposure time) based on the raw data (i.e., the raw data of the cropping area) that is input from the camera 10A via the DPTZ controller 130A, and compares the calculated value of parameter with the parameter stored in the RAM 115A. By so doing, whether or not the parameter stored in the RAM 115A is inappropriate is determined (step S5). When these two values are different from each other, it can be determined that the parameters are inappropriate.

When the determination in the step S5 is negative ("NO" in the step S5), the process returns to the step S4. When the determination in the step S5 is positive ("YES" in the step S5), the picture processing unit 20A updates a parameter (including an exposure time) to be used for exposure control that is linked to the cropping area (i.e., the current display area), to a value calculated from the raw data (step S6). After that, the processes in the step S4 and the following steps are repeated.

In the present example case, after the step S1 and the step S2 as above, the processes in the step S51 and the step S52 are repeatedly performed in the background. In a step S51, the detection unit 141A detects the presence or absence of a change in the capturing environment based on the raw data that is continuously input from the camera 10A (all of the picture data). How the presence or absence of a change in the capturing environment is detected is same as above.

When a change in the capturing environment is detected by the detection unit 141A ("YES" in the step S51), the update unit 142A calculates from the raw data at that time a parameter (including an exposure time) to be used for exposure control for each of the multiple cropping areas, and updates, in the RAM 115A, a parameter to be used for exposure control that is linked to the multiple cropping areas with the calculated value (step S52).

In the description as above, attention is focused on a parameter to be used for exposure control, which is a parameter to be updated. However, a parameter to be updated is not limited to the parameter to be used for exposure control. Alternatively, other parameters that are related to camera control and picture processing may be updated in a similar manner to the above procedure.

As described above, in the present embodiment, the presence or absence of a change in the capturing environment is detected at any time after the conference starts. When a change in the capturing environment is detected, the parameters to be used for picture processing that are linked to all the cropping areas are simultaneously updated in the background based on the detected change. Due to this configuration, even if the capturing environment changes during the conference, the picture that is optimized for the scene of the present time can be obtained without delay.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims. For example, some of the elements described in the above embodiments may be removed.

A program for the videoconference system 1 according to the above-described embodiment and variation may be installed for distribution in any desired computer-readable recording medium such as a compact disc, a read-only memory (CD-ROM), a flexible disk (FD), a compact disc-recordable (CD-R), and a digital versatile disk (DVD), a universal serial bus (USB) in a file format installable or executable by a computer, or may be provided or distributed via network such as Internet. Alternatively, various kinds of programs may be integrated in advance, for example, into a ROM inside the device for distribution.

The hardware platform includes any desired kind of hardware resources including, for example, a CPU, a RAM, and a HDD. The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. An image processing device, comprising:
an imaging device configured to perform capturing to generate picture data;
processing circuitry configured to crop a particular display area out of the generated picture data, cause a display to display image data corresponding to the particular display area, calculate a particular parameter used for picture processing of the particular display area, and store, in a memory, the calculated particular parameter in association with information defining the particular cropped display area;
the memory to store parameter information, including, for each display area of a plurality of cropped display areas cropped by the processing circuitry, a corresponding parameter used for the picture processing of the display area; and
a detector configured to repeatedly monitor a capturing environment of the imaging device to detect a change in the capturing environment,
wherein the processing circuitry is further configured to
update, in response to the change in the capturing environment being detected by the detector, the parameter information, by separately calculating a new value of the corresponding parameter for each of the plurality of cropped display areas stored in the memory, including a current display area being displayed, based on the detected change in the capturing environment; and
change a setting of the imaging device according to the updated parameter information.

2. The image processing device according to claim 1, wherein the processing circuitry is further configured to
calculate, for each display area of the plurality of cropped display areas, an optimal value of the corresponding parameter, from the picture data, in response to the change in the capturing environment being detected by the detector, and
update the parameter information according to the calculated optimal value.

3. The image processing device according to claim 1, wherein the corresponding parameter for each display area is an exposure control parameter used for exposure control, the exposure control parameter being an exposure time.

4. The image processing device according to claim 1, wherein
the imaging device generates the picture data, which is temporally continuous, by performing the capturing in a temporally continuous manner, and
the detector detects the change in the capturing environment from a degree of change in the picture data.

5. A method of processing picture data generated by an imaging device, the method comprising:
cropping a particular display area out of the generated picture data;
causing a display to display image data corresponding to the particular display area;
calculating a particular parameter used for picture processing for the particular display area;
storing, in a memory, the calculated particular parameter in association with information defining the particular cropped display area;
storing, in the memory, parameter information, including, for each display area of a plurality of cropped display areas, a corresponding parameter used for the picture processing of the display area;
repeatedly monitoring a capturing environment of the imaging device to detect a change in the capturing environment;
updating, in response to the change in the capturing environment being detected in the detecting step and based on the detected change, the parameter information, by separately calculating a new value of the corresponding parameter for each of the plurality of cropped display areas stored in the memory, including a current display area being displayed; and
changing a setting of the imaging device according to the updated parameter information.

6. A picture transmission and reception system, comprising:
a first end device and a second end device, each of which includes an imaging device configured to capture an image to generate picture data, the first end device and the second end device exchanging a particular display area cropped from picture data obtained by capturing an image by the imaging device included in each one of the first end device and the second end device, wherein each of the first end device and the second end device further comprises:
processing circuitry configured to crop the particular display area out of the generated picture data, cause a display to display image data corresponding to the particular display area, calculate a particular parameter used for picture processing of the particular display area, and store, in a memory, the calculated particular parameter in association with information defining the particular cropped display area;
the memory to store parameter information, including, for each display area of a plurality of cropped display areas cropped by the processing circuitry, a corresponding parameter used for the picture processing of the display area; and
a detector configured to repeatedly monitor a capturing environment of the imaging device to detect a change in the capturing environment,
wherein the processing circuitry is further configured to update, in response to the change in the capturing environment being detected by the detector, the parameter information, by separately calculating a new value of the corresponding parameter for each of the plurality of cropped display areas stored in the memory, including a current display area being displayed, based on the detected change in the capturing environment; and
change a setting of the imaging device according to the updated parameter information.

7. The image processing device of claim 1, wherein the memory stores the parameter information including, for each display area, the corresponding parameter, which is one of an affine transformation parameter and an exposure time.

8. The image processing device of claim 1, wherein the detector is configured to monitor the capturing environment of the imaging device in the background.

\* \* \* \* \*